United States Patent

[11] 3,623,524

| [72] | Inventor | Edwin James Buck<br>Victoria, Australia |
|---|---|---|
| [21] | Appl. No. | 788,679 |
| [22] | Filed | Dec. 11, 1968 |
| [45] | Patented | Nov. 30, 1971 |
| [73] | Assignee | Tripax Engineering Company Proprietary Limited<br>Victoria, Australia |

[54] MACHINE FOR PREPARING ONIONS
12 Claims, 14 Drawing Figs.

[52] U.S. Cl.................................................. 146/43, 146/83
[51] Int. Cl.................................................. A23n 15/04
[50] Field of Search.........................................146/83, 43, 84

[56] References Cited
UNITED STATES PATENTS

| 2,766,794 | 10/1956 | Odale............................ | 146/43 X |
| 3,485,279 | 12/1969 | Parsons........................ | 146/43 X |
| 3,515,193 | 6/1970 | Aguilar......................... | 146/83 X |

*Primary Examiner*—Andrew R. Juhasz
*Assistant Examiner*—Z. R. Bilinsky
*Attorney*—Imirie and Smiley ABSTRACT: An onion-preparing machine comprising a conveyor adapted to carry onions past two spaced blades to cut a predetermined portion from the top and tail of the onions, a further conveyor adapted to receive the onions from the first-mentioned conveyor and carry them past two further spaced blades which slit the skin and adjacent layers of the onions longitudinally thereof, and two air jets arranged to direct high-pressure air into said longitudinal slits to remove the slit skin and layers from the onions.

PATENTED NOV 30 1971 3,623,524

INVENTOR
EDWIN J. BUCK
ATTYS.

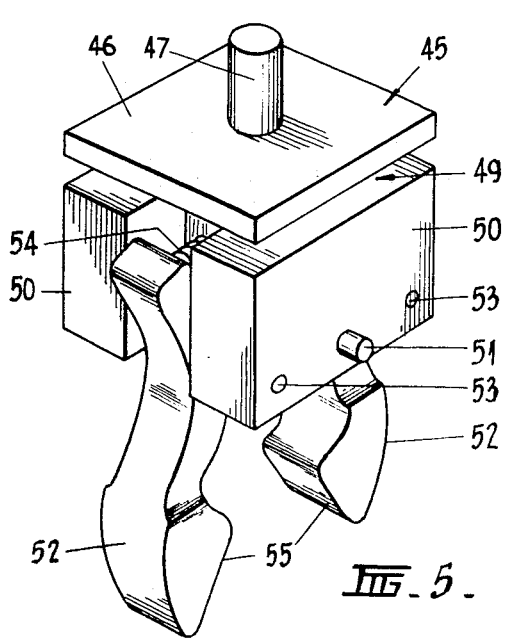
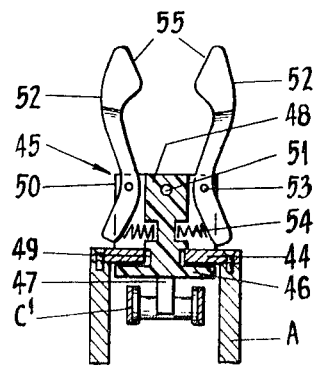
FIG. 6.
FIG. 5.
FIG. 7.
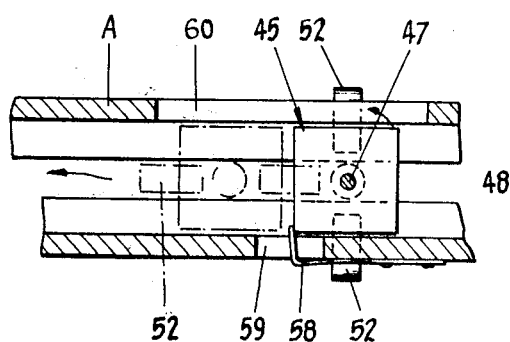
FIG. 9.
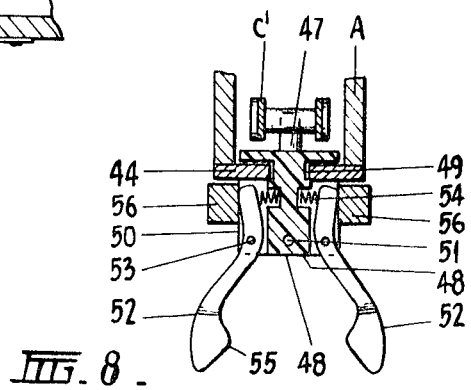
FIG. 8.
INVENTOR
EDWIN J. BUCK

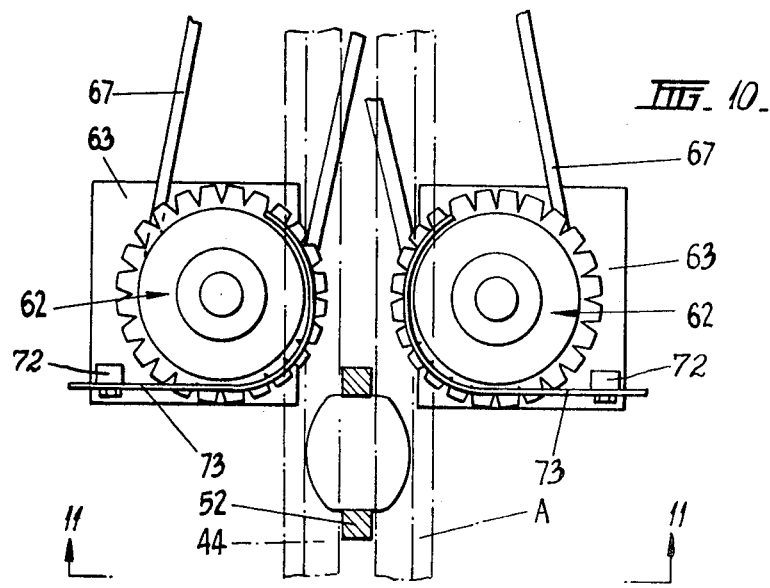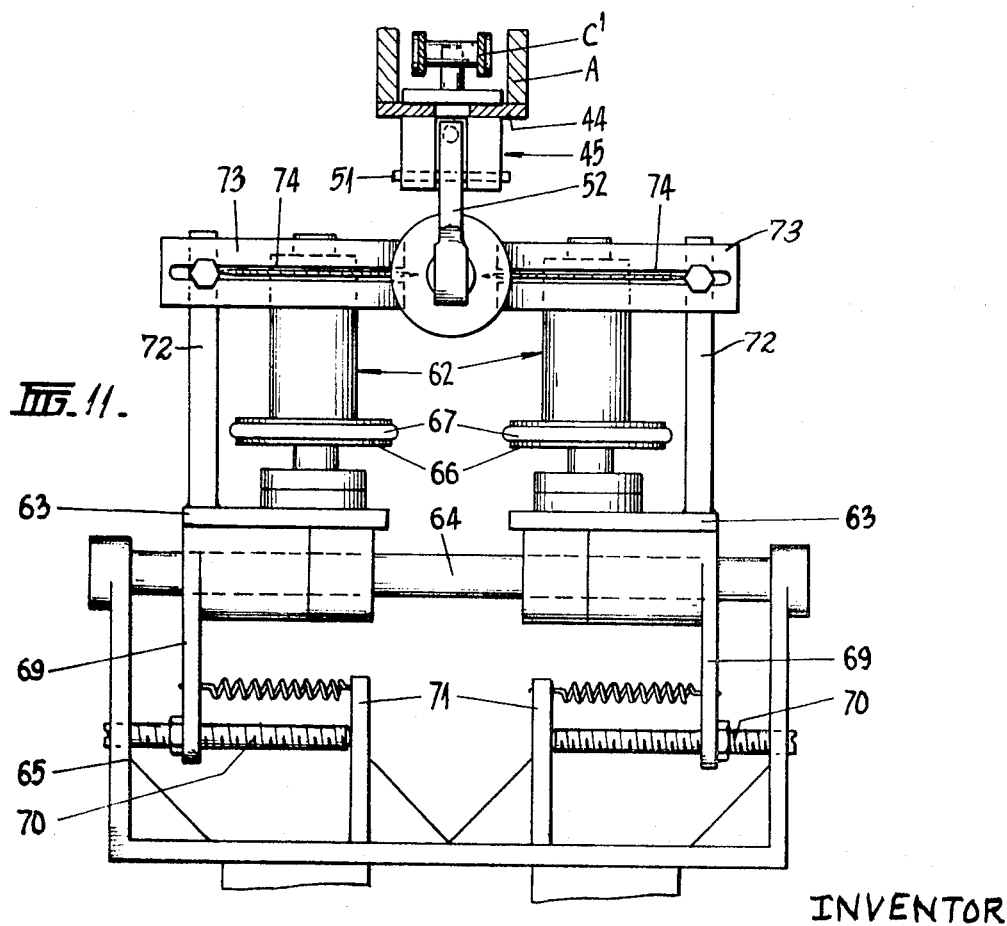

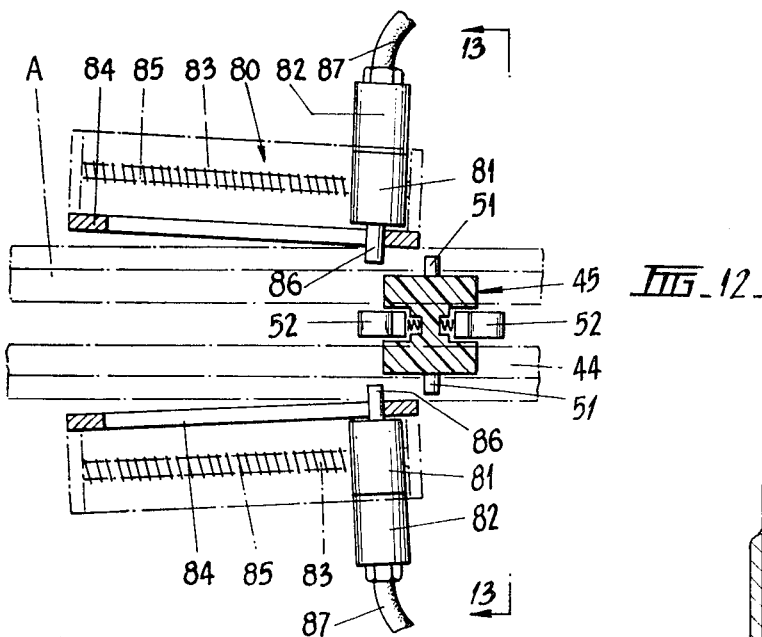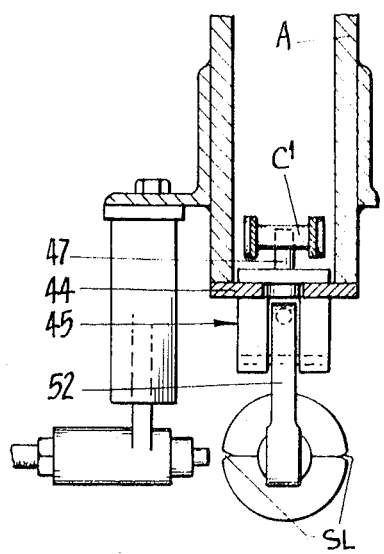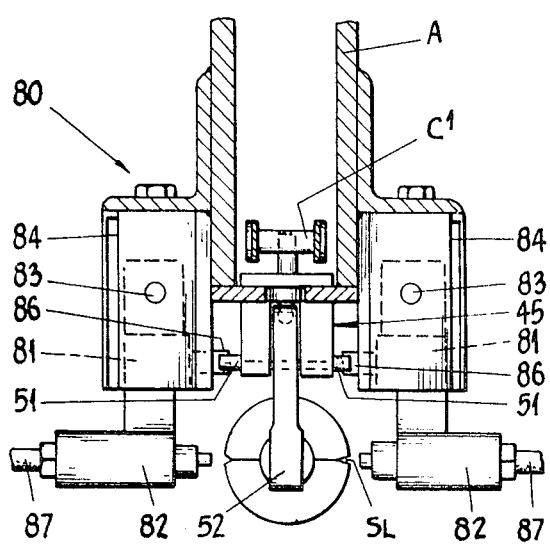

MACHINE FOR PREPARING ONIONS

This invention relates to a machine for preparing onions and more particularly to a machine for peeling the skin and/or outer layers from onions so that they are ready for further processing, such as pickling, dicing or slicing.

At the present time the peeling of onions for pickling and the like is mainly done by hand. Onion-peeling machines have been proposed but their main disadvantages have been complexity of construction and ineffective operation. One such machine incorporates a complex mechanical finger mechanism which operates to strip the circumferentially slit skin from each end of the onion.

It is one object of the invention to provide a machine for preparing onions which is relatively simple in construction and yet to a large extent overcomes the disadvantages of previously known machines.

According to the invention there is provided an onion-preparing machine comprising conveyor means adapted to carry the onions, means for cutting a predetermined portion from the top and tail of the onions as they are transported by the conveyor means, means for slitting the skin and, if required, the adjacent layers of the onions along at least one longitudinal line, and jet means for directing a stream of pressurized fluid into the or each slit to remove the slit skin and layers from the onion. The conveyor means includes a plurality of spaced means for firmly holding the onions while they are being operated upon.

A preferred embodiment of the invention will now be described with reference to the accompanying drawings in which:

FIG. 2 is a cross-sectional side elevation of part of the machine of FIG. 1 showing its general layout;

FIG. 6 is a cross-sectional and elevation of the gripping mechanism of FIG. 5 showing its assembly to the track of the second conveyor;

FIG. 7 is an end elevation of part of the second conveyor showing the cam means for opening the gripping mechanism of FIG. 5 and 6;

FIG. 8 is a cross-sectional and elevation of the gripping mechanism of FIGS. 5 and 6 assembled on the track and being operated by the cam means of FIG. 7;

FIG. 9 is a plan view, from inside the second conveyor, of part of the conveyor track showing the manner in which the gripping mechanism is turned prior to the peeling section;

FIG. 10 is a plan view of the skin slitter of the peeling section of the second conveyor;

FIG. 11 is an end elevation taken in the direction 11—11 of FIG. 10;

FIG. 12 is a plan view from beneath of the skin removal means of the peeling section of the second conveyor;

FIG. 13 is an end elevation taken in the direction 13—13 of FIG. 12; and

FIG. 14 is an end elevation similar to that of FIG. 13 showing an alternative skin removal means.

Figures 1, 3, 4:
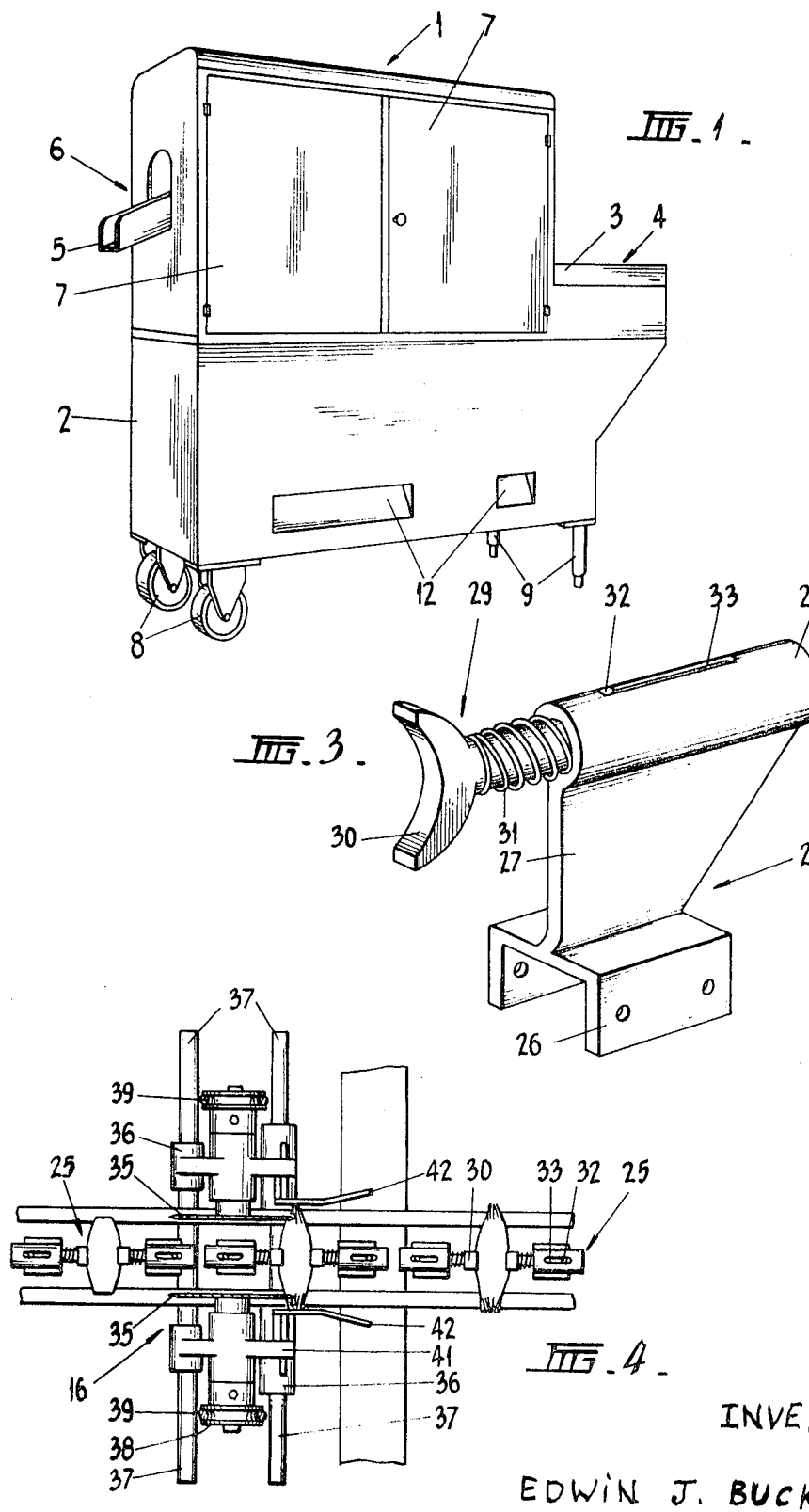
FIG. 1 is a perspective view of the onion-preparing machine embodying the invention.
FIG. 3 is an enlarged perspective view of one onion-gripping finger of the first conveyor of the mechanism.
FIG. 4 is a plan view of part of the topping and tailing means of the machine.

The machine 1 depicted in FIG. 1 has an onion-preparing mechanism enclosed within a casing 2 having an access opening 3 at the feed-in end 4 and a delivery chute 5 at the delivery end 6. The casing 2 has doors 7 for gaining access to the onion-preparing mechanism for repair and adjustment and is provided with wheels 8 and support legs 9 on its base. The casing 2 is also provided with rubbish chutes 10, 11 (FIG. 2) for the topping and tailing and peeling sections of the mechanism and these terminate in exit apertures 12 as shown in FIG. 1. The casing 2 is formed with suitable ventilation openings (not shown) positioned so that the fumes of the juices produced by the cutting operations do not affect the operator.

The onion-preparing mechanism, the general layout of which is shown clearly by FIG. 2, comprises two onion conveyors 14 and 15 supported within casing 2. The conveyor 14 is arranged for horizontal operation and is adapted to present onions to a topping and tailing means generally indicated by the reference 16 and for transfer to conveyor 15. The conveyor 15 is arranged at a small angle to the horizontal and has a portion at one end positioned over the adjacent end portion of conveyor 14 so that the transfer operation to be described can take place. This conveyor operates to present onions, taken from conveyor 14, to a peeling section indicated by reference 17.

The conveyor 14 is driven by a variable-speed motor (not shown) mounted in the lower portion of the casing 2 and connected through a drive belt 18 to a pulley on the shaft 19 of the drive sprocket S for the conveyor chain C. Drive is transmitted from shaft 19 through bevel gears to a drive transfer shaft 20, which transmits drive, through identical bevel gearing, to the shaft 21 of the drive sprocket S' for the conveyor chain C' of conveyor 15. This drive connection ensures that the two conveyors 14, 15 always run at the same speed. The drive transfer shaft 20 comprises two shaft portions connected by a sleeve (not shown) which allows the operation of the conveyors 14, 15 to be relatively adjusted to produce the necessary alignment therebetween.

The chain C of conveyor 14 supports a plurality of evenly spaced onion gripping assemblies 24 each of which comprises a pair of grippers 25, one of which is shown in FIG. 3. The gripper 25 has a channel section base 26 having two apertures in each sidewall thereof for connection to the conveyor chain. A web 27 extending perpendicularly from the base 26 supports a guide sleeve 28 for the stem of a gripper finger 29 having an arcuate onion-engaging end portion 30. A compression spring 31 is arranged around the stem between the end portion 30 and the end of guide sleeve 28 to bias the finger 29 out of the sleeve 28. The finger 29 is retained in the guide sleeve 28 by means of a pin 32 on the stem and engaging a longitudinal slot 33 in the wall of the guide sleeve.

The grippers 25 of each assembly 24 are spaced apart a distance which allows an onion to be gripped between the arcuate end portions 30 (FIGS. 2 and 4), the spring biasing of the fingers compensating for variations in the size of the onions and providing the force necessary for gripping. In the present embodiment, the onions are manually inserted between the fingers 29 as each assembly 24 passes around the end of the conveyor 14. It will be realized that the fingers 29 will part at this point to allow insertion of an onion due to the natural increase in the spacing of the links of the chain C as it passes around sprocket S.

The topping and tailing means 16 (FIG. 4) comprises two serrated edge rotary cutters 35 arranged for coaxial rotation one at each side of the conveyor 14. Each cutter 35 has its shaft mounted in a bearing at the apex of a triangular carriage 36 which is slidably mounted at its base on parallel bars 37 arranged transversely of the conveyor 14. The cutters 35 are biased towards each other by spring means or the like (not shown) is provided to adjust the minimum distance between the cutters 35 so that both very small and very large onions may be prepared. The two cutters 35 have pulleys 38 keyed to the ends of their shafts and drive is transmitted to the pulleys through belts 39 from motor 40 (FIG. 2) mounted in the casing 2.

The carriages 36 each have an integral support post 41 for a cam plate 42 arranged with its cam face directed towards the conveyor 14. As will be clear from FIG. 4, the cam faces of the plates 42 are engaged by the ends of an onion carried by an assembly 25 and this forces the carriages 36, and thus the cutters 35, apart a distance determined by the length of the onion. The relative spacing between the cam plates 42 and the associated cutters 35 determines the amount cut off each end of the onion. To allow for different onions, this is adjustable by making the cam plates 42 movable relative to the posts 41 in any suitable way.

Figure 5:
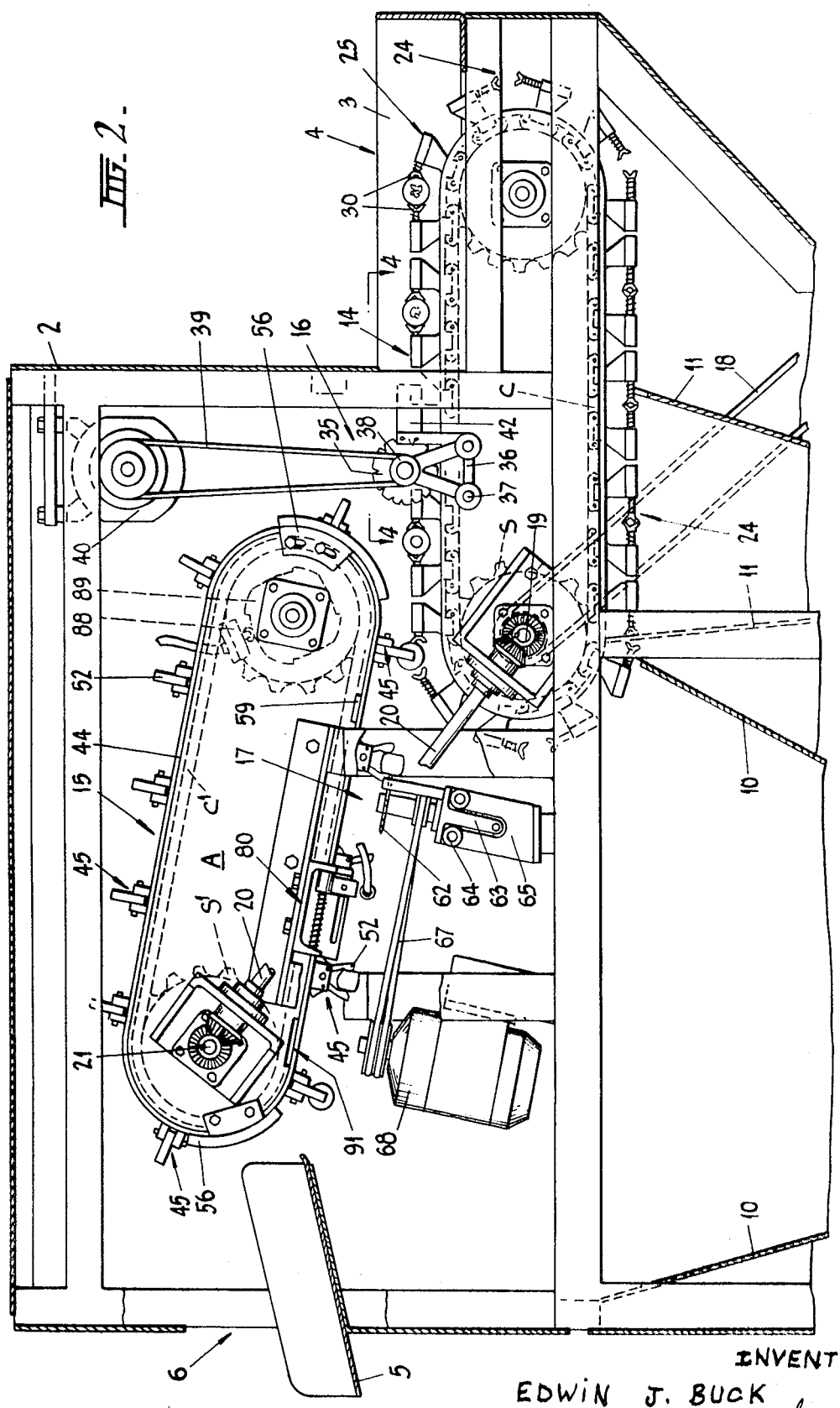
FIG. 5 is an enlarged perspective view of the onion-gripping mechanism of the second conveyor.

The chain C' of conveyor 15 is positioned under a slot track 44 secured to the side edges of the conveyor casing A. The track 44 supports a plurality of onion-gripping assemblies 45 which are spaced identically to gripping assemblies 25. The assembly 45 (FIGS. 5 and 6) comprises a rectangular base 46 from which a drive pin 47 extends perpendicularly at one side and an integral rectangular support stem 48 extends perpendicularly at the other side. As shown in FIG. 6, the pin 47 is adapted to engage conveyor chain C' and the support stem 48 is formed with a groove 49 adapted to be engaged by the track 44. The groove 49 has an annular form when viewed in plan, for a purpose to be defined later. Two parallel sideplates 50, which are wider than stem 48 are fixed to the stem by a pin 51 passing through the plates 50 and the stem. The pin 51 projects a short distance from each sideplate 50 for a purpose to be mentioned below. Two onion-gripping fingers 52 are pivoted between the overhanging ends of the sideplates 50 by pins 53 as shown. The fingers 52 are biased by compression springs 54 arranged in pockets in the stem 48 and engaging the inner ends of the fingers 52. The outer or gripping ends 55 of the fingers are shaped to grip an onion by its topped and tailed ends (FIGS. 2 and 10).

The fingers 52 are parted for onion gripping by means of opposed cam plates 56 at each side of the track and mounted on the conveyor casing A by bolts as shown in FIG. 2. The plates 56 have an arcuate form which corresponds to the curvature of the ends of the conveyor 15 and the connection to the casing A is adjustable by virtue of slotted holes in the mounting brackets. As shown in FIG. 7, the cam faces of the plates 56 converge along the track 44 so that as the gripping assembly 45 is pulled through the cam plates 56, the inner ends of the fingers 52 will engage the cam faces and the fingers are pushed apart against the action of springs 54 (see FIG. 8).

As mentioned above, the speed of conveyors 14 and 15 is the same and the two conveyors are adjusted, through shaft 20, so that the gripping assemblies 25 and 45 are aligned at the onion transfer position. It will be seen in FIG. 2 that the cam plates 56 are positioned so that when the assemblies 25, 45 are first in alignment, the fingers 52 will be fully opened by the cam plates to straddle the onion. When the assembly 45 leaves the cam plates 56, the fingers 52 grip the ends of the onion firmly under the action of the springs 54. Shortly after, the chain C passes around the sprocket S and the fingers 29 of the assembly 25 are opened and the onion is completely transferred to the assembly 45 on the conveyor 15.

After transfer, the onions are carried by the conveyor 15 to the peeling section 17 where the skin and outer layers of the onion are slit longitudinally at diametrically opposite positions and then removed by compressed air blasts directed at the slits. Now since the onions are arranged transversely of the direction of travel after transfer and the slitting is to be performed as the onion moves past the slitting means, the gripping assembly 45 must be rotated through 90° The means by which this is performed is shown in FIG. 9.

As mentioned before, the assembly 45 has a pin 47 on base 46 which engages the conveyor chain and a circumferential groove 49 which is engaged by the track 44 so the assembly is quite free to turn about the longitudinal axis of the stem 48. The base 46 of the assembly 45 is arranged inside the track and between the walls of the conveyor casing A. A resilient lug 58 comprising an L-shaped strip of spring steel is secured to the outer face of one wall of the casing A with the short leg of the L projecting through an aperture 59 in casing A and into the path of the base 46 of assembly 45. The lug 59 turns the assembly 45 through 90° by engaging one corner of the base 46. This corner of the base 46 is restrained by the lug 45 but since the base must move with the conveyor, it turns through 90° to free itself from the lug. An elongate opening 60 is provided in the other wall of the casing A to allow for the turn.

The longitudinal slitting of the skin and adjacent layers of the onion is performed by two serrated edge rotary cutters 62, similar to cutters 35, arranged one at each side of the conveyor. Reference to FIGS. 2 and 11 will show that the cutters 62 are mounted for rotation on carriages 63 which are in turn mounted for reciprocation on parallel bars 64 extending transversely of conveyor travel on a frame 65 arranged as shown in FIG. 2. Each cutter 62 is provided with a pulley 66 to which drive is transmitted through belts 67 from a motor 68 suitably mounted near the cutters 62. The carriages 63 each have a downwardly depending extension 69 carrying a screw 70 which is adapted to engage a stop bracket 71 on the frame 65 and by means of which the movement of the carriages 63 towards each other is adjustably limited. Tension springs 72 are connected to the stops 71 and to the extensions 69 to bias each carriage 63 towards each other until screws 70 engage stops 71.

The carriages 67 also have upstanding posts 72 which each support an arcuate cam plate 73. Each cam plate 73 is formed with an elongate slot 74 through which the edges of cutters 62 project. The cam plates 73 are adjustably secured to posts 72 by bolts so that the distance between the cutting edge of cutters 62 and cam face of the associated cam plate 73 may be adjusted. As the onion is carried by the gripping assembly 45 between the cutters 62, the cutters slit the skin and adjacent layers until the onion is engaged by the cam plates 73. The cam plates then follow the contour of the onion to give the same depth of cut throughout the length of the onion.

The removal of the thus slit skin and adjacent layers of the onion is effected by an air jet assembly 80, shown in detail in FIGS. 12 and 13, mounted on the conveyor casing A in the position shown in FIG. 2. The assembly 80 comprises two carriages 81, movable longitudinally of the conveyor, each supporting an air jet 82 at one side of the conveyor and directed inwardly towards the slit SL of a passing onion. Each carriage 81 is supported for reciprocation on a rod 83 extending generally longitudinally of the conveyor 15 and mounted on a frame 84 fixed to a bracket on the casing A. As will be clear from FIG. 12, the two frames 84 diverge in the direction of travel of the conveyor. Springs 85 are arranged on rods 83 between the ends of frames 84 and carriages 81 so that the carriages are biased towards the position of FIG. 12. Each carriage 81 is provided with a pin 86 which is directed into the path of pins 51 on the gripping assembly 45 as seen in FIGS. 12 and 13. The relative arrangement of the pins 86 and 51 is such that when they engage, the air jets 82 will be positioned centrally of the longitudinal slits SL in the onion carried by the gripping assembly 45. As the assembly 45 moves along the track 44, the air jet carriages 81 will be moved in unison therewith until the pins 86 become disengaged from the pins 51 due to the divergence of the frames 84, whereupon the carriages 81 return to the rest position under the action of springs 85.

The air jets 82 are supplied with compressed air from any suitable compressor or other source through air lines 87 connected to a distribution manifold (not shown). The line between the compressor and manifold is interrupted by a valve 88 (FIG. 2) which is operated in a timed relationship to the travel of the assemblies 45 by means of a cam 89 fixed to the idler sprocket of the conveyor 15. The cam 89 if formed to open the valve 88 for the time during which the pins 86 and 51 are engaged so that an air blast will be directed into the slit SL for this period.

For optimum operation of the skin removal air jet assembly 80, the nozzles of air jets 82 are of elliptical configuration and an air pressure of between 60 and 80 p.s.i. is employed, the capacity of supply being approximately 20 cubic feet free air delivery per minute. The distance between air jets 82 and the onion is preferably kept as close as possible to five-sixteenths inch. The air jets 82 are adjustably held by the carriages 81 for this purpose.

After leaving the air jet assembly 80, the gripper assembly 45 is again turned through 90° at 91 (FIG. 2) by a resilient lug identical to lug 59 described previously and which is mounted on the opposite side of casing A to lug 59 so that the assembly 45 is turned back to its original position. As the assembly 45 starts to round the end of conveyor 15 it is engaged by two cam plates 92 identical to cam plates 56 and which operate to open the fingers 52 so that the onion drops into chute 5.

The sequential method of preparing the onion will be evident from the above but to reiterate, it is as follows: The onion is placed between the fingers 29 of a gripping assembly 24, as it rounds the end of conveyor 14, and is carried through the cutters 35 where a predetermined amount is removed from the top and tail of the onion. The onion is then transferred from assembly 25 to gripping assembly 45 on conveyor 15. The gripping assembly 45 is turned through 90° so that the onion passes longitudinally through cutters 62 which slit the skin and adjacent layers to a predetermined depth. The onion is then carried between the two air jets 82 which are moved in unison with the assembly 45 for a short distance so that an air blast is directed into each slit to remove the slit skin and layers from the onion. The onion is then released from the gripper assembly into the delivery chute 5 where it is removed for further processing if desired.

An alternative air jet assembly is shown in FIG. 14 and comprises two air jets 82', only one of which is shown, arranged as in FIG. 13 but secured rigidly to the brackets on conveyor casing A. In this case the cam 89 if modified to open the valve 88 for a shorter period.

It will be realized that the conveyor 14 may be fed with onions from some suitable feeding means rather than manually and that various other modifications may be made to the preparing mechanism within the scope of the invention.

I claim:

1. An onion-preparing machine comprising conveyor means adapted to carry onions along a predetermined path and including two conveyor sections each carrying a plurality of means for firmly holding onions individually, the holding means of the first of said conveyor sections being disposed to hold the onions with their top-to-tail axis arranged transversely of said path, means disposed adjacent said path for cutting a predetermined portion from the top and tail of the onions as they are transported by the conveyor means, the holding means of the second of said conveyor sections being disposed to receive the onions from said first conveyor section holding means after the onions have passed said cutting means and to support the onions with their top-to-tail axis arranged longitudinally of said path, means disposed adjacent said path for slitting at least the outer layer of skin of the onions along at least one longitudinal line extending between the cut top and tail while the onions are each firmly held by said onion-holding means, and jet means disposed adjacent said path for directing a stream of pressurized fluid directly into the slit of each onion to remove the slit skin layers from the onion while the onion is firmly held by said onion-holding means.

2. An onion-preparing machine according to claim 1, wherein said slitting means comprises two blades arranged one at each side of the conveyor means to slit said onions longitudinally along diametrically opposed lines to a predetermined constant depth from the skin.

3. An onion-preparing machine according to claim 1, wherein said slitting means comprises two rotary cutters mounted for rotation about parallel axes perpendicular to the direction of travel of the onions one at either side of the conveyor means, said slitting means including cam means arranged to follow the contour of said onion along said longitudinal lines and being adjustably supported relative to the cutters to prevent penetration of the cutters beyond a predetermined depth from the skin of the onions.

4. An onion-preparing machine according to claim 3, wherein said cam means comprises an arcuate cam plate supported near each of the cutters and having a slot through which the cutting edge of the associated cutter projects a distance corresponding to said predetermined depth.

5. An onion-preparing machine according to claim 2, wherein said jet means comprises an air jet member mounted to be adjacent each slit in an onion as it is transported by the conveyor means.

6. An onion-preparing machine according to claim 3, wherein said jet means comprises two air jet members mounted one at each side of the conveyor means to direct air jets towards and adjacent the slits in an onion transported by said conveyor means.

7. An onion-preparing machine according to claim 6, wherein said air jet members are each mounted on a reciprocable carriage supported by a fixed frame, said carriage having means adapted to be engaged by said conveyor means at positions corresponding to each onion supported by the conveyor means said carriages moving in unison with the onions for a predetermined distance along the path of travel, and means for disengaging each said carriage means from said conveyor means and returning said carriages to their initial positions.

8. An onion-preparing machine according to claim 7, wherein said conveyor means comprises a pin at each onion-holding means, said carriage means comprises a pin arranged to lie in the path of said conveyor means pins for engagement therebetween, said fixed frames being mounted to diverge in the direction of travel of the conveyor means so that the pins gradually move out of engagement and disengage adjacent the ends of the frames and returning means comprising compression springs between each carriage means and each fixed frame.

9. An onion-preparing machine according to claim 1, wherein said conveyor sections comprise one chain conveyor mounted for generally horizontal operation and another chain conveyor mounted for operation at a small inclination to the horizontal, said chain conveyors overlapping at one end such that onions supported by said one conveyor are capable of being transferred to the other conveyor, said cutting means being mounted adjacent said one conveyor and said slitting and air jet means being mounted in spaced relation adjacent the other conveyor.

10. An onion-preparing machine according to claim 9, wherein said onion-holding means comprises a plurality of equally spaced onion-gripping assemblies each comprising a pair of spring-loaded onion-engaging fingers.

11. An onion-preparing machine according to claim 10, wherein said onion-gripping assemblies for said other conveyor are rotatable about an axis perpendicular to the conveyor chain, each said assembly being turned through 90° immediately after passing the transfer position by a resilient lug adapted to resiliently engage one corner of the assembly.

12. A machine, according to claim 1 wherein said onion-holding means on said first conveyor section comprises gripping assemblies, each gripping an onion about its center portion, and said onion-holding means on said second conveyor section comprises gripping assemblies, each gripping an onion by its cut ends.

* * * * *